(12) United States Patent
Feldman

(10) Patent No.: US 6,296,292 B1
(45) Date of Patent: Oct. 2, 2001

(54) VEHICLE CRASH-SAFETY SEAT

(76) Inventor: Yakov Feldman, 1425 N. Cherokee Ave., Los Angeles, CA (US) 90093

( * ) Notice: Subject to any disclaimer, the term of this patent is extended or adjusted under 35 U.S.C. 154(b) by 0 days.

(21) Appl. No.: 09/574,047

(22) Filed: May 18, 2000

(51) Int. Cl.$^7$ ................................................. B60N 2/42
(52) U.S. Cl. .................. 296/68.1; 297/216.1; 280/728.2
(58) Field of Search ...................... 296/68.1; 297/216.18, 297/216.1; 280/728.1, 728.2

(56) References Cited

U.S. PATENT DOCUMENTS

| | | | |
|---|---|---|---|
| 3,556,584 | * | 1/1971 | Simon ................................ 296/68.1 |
| 3,591,232 | * | 7/1971 | Simon ................................ 296/68.1 |
| 4,301,983 | * | 11/1981 | Horan ............................. 296/68.1 X |
| 5,149,165 | * | 9/1992 | Woolley ............................. 296/68.1 |
| 5,340,185 | * | 8/1994 | Vollmer ............................. 296/68.1 |
| 5,695,242 | * | 12/1997 | Brantman et al. ................ 297/216.1 |

* cited by examiner

Primary Examiner—Joseph D. Pape

(57) ABSTRACT

A vehicle crash-safety seat, for an occupant (driver or passenger), including a seat bottom having a deploying air bag mounted in said seat bottom and shooting upward out of said seat bottom when the deploying air bag is inflated during a vehicle collision of a predetermined severity. The inflated air bag forms an enlarged effective contact surface with a lower occupant's body and forces the occupant's body to move into a folded restraining position, thereby transmitting an upward motion of the inflated air bag to a backward motion of the occupant's body. The backward motion of the occupant's body restrains a vehicle occupant from a forward inertial movement and protects the occupant from receiving serious or fatal injuries during a vehicle collision. After inflating, the deploying air bag of the seat bottom immediately deflates. The entire process of inflating, protecting, and deflating takes place in a fraction of a second.

9 Claims, 2 Drawing Sheets

VEHICLE CRASH-SAFETY SEAT

CROSS-REFERENCE TO RELATED APPLICATIONS

Not Applicable

STATEMENT REGARDING FEDERALLY SPONSORED RESEARCH OR DEVELOPMENT

Not Applicable

REFERENCE TO A MICROFICHE APPENDIX

Not Applicable

BACKGROUND OF THE INVENTION

The present invention relates to a vehicle occupant restraining system, in particular to a vehicle crash-safety seat for an occupant (driver or passenger) which has a deploying air bag mounted in the seat bottom and adapted to shoot upward out of the seat bottom when the deploying air bag is inflated during a vehicle collision.

Starting in model year 1999, the federal government required automakers to install driver and passenger air bags for frontal protection in all cars, light trucks, and vans. Still, about 30,000 occupants die in crashes on U.S. roads each year. Most of these people die in frontal crashes.

An air bag is a large inflatable bag placed inside the steering wheel and inside the dashboard. When sensors placed around vehicle detect a collision, they trigger off the air bags to inflate. This is supposed to happen at vehicle speeds above 10–15 mph. The rapid inflation is made possible by a small canister of sodium azide that releases nitrogen gas and sodium hydroxide dust. This chemical reaction causes the air bag to inflate with over 1000 pounds of pressure, there is a lot of force. During this inflation, the canister heats up to about 300 degrees of temperature. To aid in a smooth release, the air bag is coated with either talc or corn starch.

For reducing a chance of injury in a crash, all occupants, sitting in vehicles, should be properly restrained, regardless of size. All front seat passengers (adults and children) should move the seat as far rearward as possible, and may tilt the seat back slightly to help maximize the distance between the passenger's chest and the instrument panel. In order to allow the air bag to deploy safely, front seat passengers should avoid leaning or reaching forward, keeping the arms away from the area in which the air bag will deploy, and should remain seated against the vehicle seat back, with as little slack in the belt as possible to minimize forward movement in a crash.

Air bags inflate with great force. If occupants unrestrained, leaning forward, sitting side ways or out of position in any way, they are at greater risk of injury or death in a crash and may also receive serious or fatal injuries from the air bag if driver or passenger is up against it when it inflates.

A big risk of serious or fatal injury offer current air bags to identifiable groups of people, for example, people who cannot avoid sitting extremely close to air bags, people with certain medical conditions, elderly people, and young children.

Some number of people may still be at risk because they will be more likely than the general population to be too close to their air bags.

When the steering wheel and the dashboard air bags inflate, a fairly loud noise may be heard, followed by release of smoke. This smoke is actually powder from the airbag's surface. The smoke may cause irritation and choking. Those with a history of breathing trouble should get fresh air promptly.

Air bags had caused the death of many occupants in low speed crashes. All crashes in which children were killed due to impacts from the air bag.

National Highway Traffic Safety Administration (NHTSA) issued a final rule requiring that all new cars have labels placed conspicuously in order to alert occupants to the dangers of placing children in the front seat of vehicles with air bags.

The energy required to inflate air bags can injure occupants on top of, or very close to, air bags as they begin to inflate. In the first few milliseconds of inflation, the forces can seriously injure anyone struck by an inflating air bag. Serious inflation injuries occur because of occupants' positions when the air bags begin inflating. Anyone on top of, or very close to, an air bag as it begins to inflate is at risk. This is why most air bag deaths involve occupants who were positioned improperly. Other occupants at risk include drivers who sit or who lean forward in their seats, so they are very close to the steering wheel, infants in rear-facing restrains, and small children, positioned in front of passenger air bags.

The Insurance Institute for Highway Safety estimates that air bags cause injuries 42 percent of the time they deploy. The more serious injuries range from broken arms and ribs to torn heart valves and bruised lungs.

Research indicates that air bags mainly kill infants, children, short women, and the elderly. Most deaths are the result of severe injuries to the brain, spinal cord or heart.

BRIEF SUMMARY OF THE INVENTION

This invention is directed to a vehicle crash-safety seat for restraining and protecting a vehicle occupant (driver or passenger) during a vehicle collision.

The object of the present invention is to provide a vehicle crash-safety seat which restrains an occupant, sitting in the vehicle seat, from moving to the side where the vehicle is impacted and protects the occupant from receiving serious or fatal injuries during the vehicle collision.

The vehicle crash-safety seat comprises a seat bottom having a deploying air bag mounted in said seat bottom and adapted to shoot upward out of said seat bottom when the deploying air bag is inflated during a vehicle collision of a predetermined severity. The inflated air bag forms an enlarged effective contact surface with an occupant's body and forces the occupant's body to move into a folded restraining position. At that time, the occupant's legs are folded upwardly thereby drawing the knees up to the occupant's chest in a folded restraining position, and the occupant's torso is pressed to the seatback of the vehicle seat.

Thereby an upward motion of the inflated air bag transmits a backward motion to the occupant's body, and therefore the backward motion of the occupant's body restrains a vehicle occupant (the lower and upper parts of the occupant's body) from a forward inertial movement during the vehicle collision.

After inflating, the deploying air bag of the seat bottom immediately deflates. The entire process of inflating, protecting, and deflating takes place in a fraction of a second.

The inflating air bag is adapted to change its position and shape depending on occupant's position in the vehicle seat.

The inflated air bag can partially jut out forward or project forward outside of the front part of the seat bottom or of the seat bottom's front edge. This jut or projection of the inflated air bag is necessary for a better contact with the lower parts of the body of an occupant sitting improperly or out of position, or who is tall. The partially jutting out forward inflated air bag increases the length of the seat bottom or of the crash-safety seat.

The inflated air bag can partially jut out or project outside of each lateral side of the seat bottom. These juts or projections of the inflated air bag is necessary for a better contact with the lower parts of the body of an occupant sitting improperly or out of position, or who is big. The partially jutting out of each lateral side inflated air bag increases the width of the seat bottom or of the crash-safety seat.

In comparison with current air bags in existing and new vehicles which may cause serious or fatal injuries during a vehicle collision described in the "Background of the invention," the objects and advantages of the vehicle crash-safety seat of the present invention, during a vehicle collision, are:

(a) to provide a seat which restrains and protects an occupant, sitting in vehicle seat, from moving to the side where the vehicle is impacted and from receiving serious or fatal injuries;

(b) to provide a seat which reliably stops the occupant's body independently of the occupant's height and age;

(c) to provide a seat which secures an occupant independently from a distance to the dashboard or steering wheel;

(d) to provide a seat which secures an occupant from smoke which appears when current air bag in existing or new vehicle inflates and it may cause irritation and choking;

(e) to provide a seat which secures an occupant from collision with objects which are placed on the steering wheel pad, on the instrument panel, or between the occupant and the steering wheel or instrument panel. Such objects may become dangerous projectiles and cause injury if the air bag inflates; and (f) to provide a seat which secures an occupant independently of the occupant's posture in the seat.

Further objects and advantages of the present invention will become apparent from a consideration of the ensuing description and drawings.

In comparison with current air bags in existing and new vehicles which may cause serious or fatal injuries during a vehicle collision, the present invention of the vehicle crash-safety seat will allow to protect a great deal of occupants from receiving serious or fatal injuries.

DETAILED DESCRIPTION OF THE INVENTION

Figure 1:
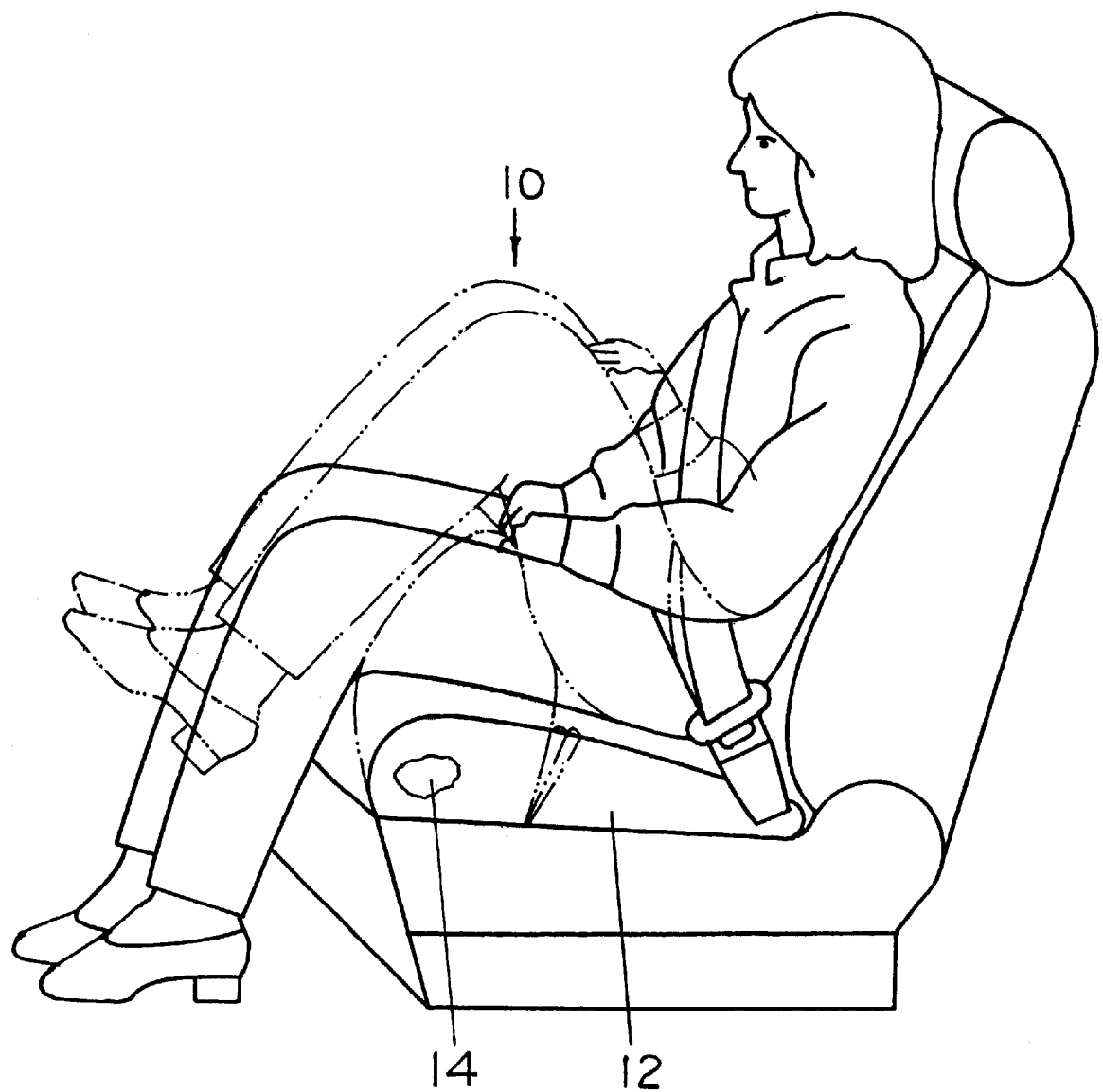
FIG. 1 is a perspective view of the vehicle crash-safety seat of the present invention with an occupant sitting in that seat shown by a continuous line for a usual position and by a broken line for a position during a vehicle collision.
Figures 2A, 2B:
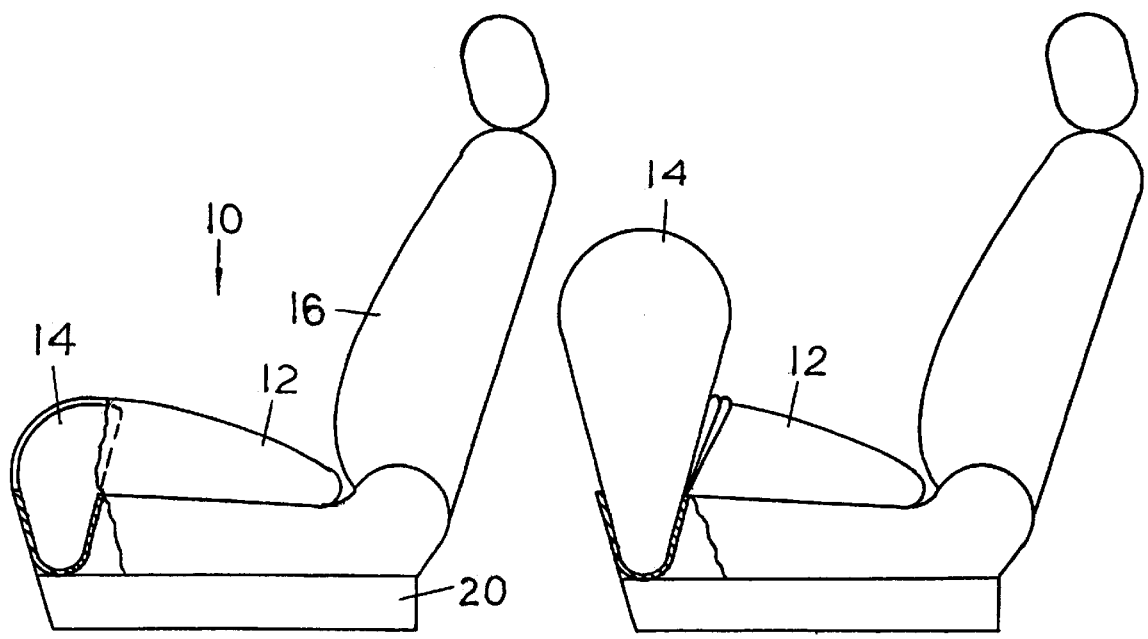
FIG. 2A is a side view of the vehicle crash-safety seat.
FIG. 2B is a moved position of the vehicle crash-safety seat of FIG. 2A during a vehicle collision
Figures 3, 4:
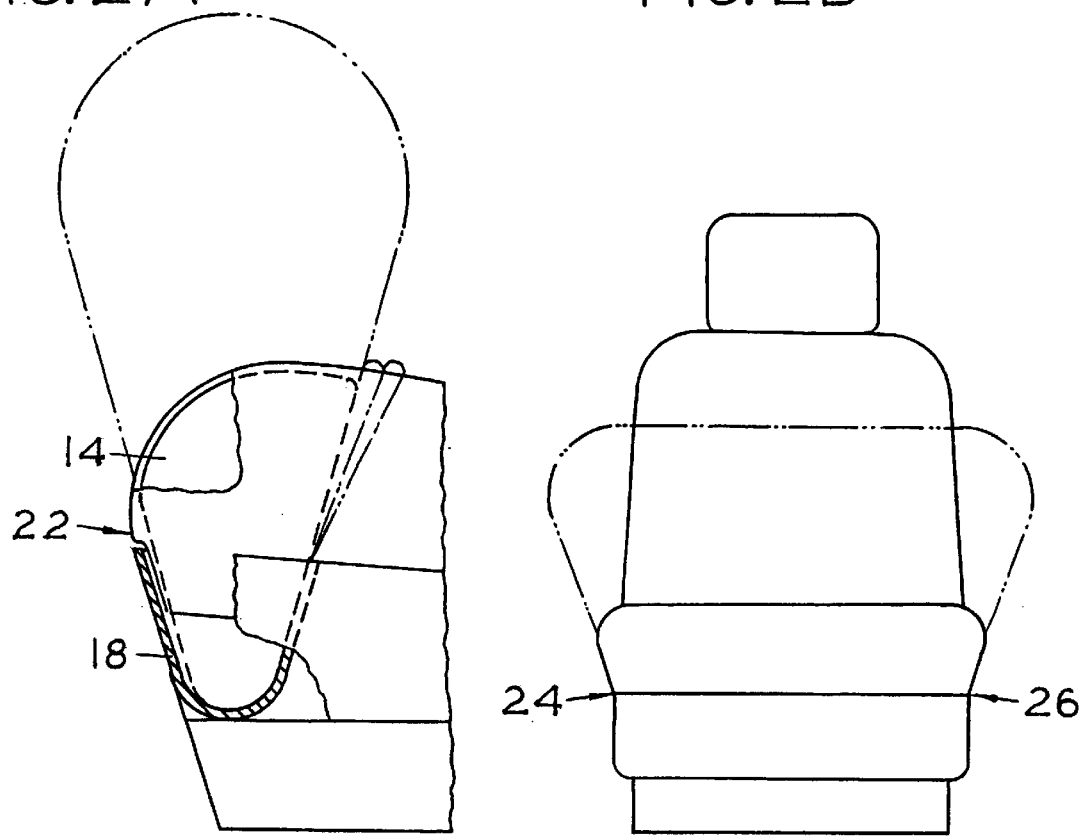
FIG. 3 is an enlarged part of the seat bottom with the air bag of FIG. 2A.
FIG. 4 is a front view of the vehicle crash-safety seat of FIG. 2A.

A vehicle crash-safety seat of the present invention is illustrated in FIGS. 1, 2A, 2B, 3, and 4. Vehicle crash-safety seat 10 comprises: a seat bottom 12 having a deploying air bag 14, a seatback 16, a guide trough 18 which is joined to the inside of a seat base 20 joining all mentioned members.

Deploying air bag 14 of the seat bottom 12 located with its lower part in the guide trough 18 of the seat base 20. Front and lateral side covers 22, 24, and 26 (FIGS. 3 and 4) of at least a portion of the seat bottom are mounted with a possibility of release from fastening.

The vehicle crash-safety seat 10 of the present invention, during a vehicle collision of a predetermined severity, works in the following way:

When sensors (not shown) detect a predetermined severity frontal collision and signal the control unit (not shown) to inflate the deploying air bag 14 of the seat bottom 12, the deploying air bag 14 instantly inflates shooting upward out of said seat bottom 12 (FIGS. 1, 2B, 3, and 4) and changing the posture of the occupant (in FIG. 1 shown by a broken line) sitting in the vehicle seat 10. The inflated air bag 14 forms an enlarged effective contact surface with an occupant's body and forces the occupant's body to move into a folded restraining position. At that time, the occupant's legs are folded upwardly thereby drawing the knees up to the occupant's chest in a folded restraining position, and the occupant's torso is pressed to the seatback 16 of the vehicle seat 10.

Thereby an upward motion of the inflated air bag 14 transmits a backward motion to the occupant's body, and therefore the backward motion of the occupant's body restrains a vehicle occupant (the lower and upper parts of the occupant's body) from a forward inertial movement during the vehicle collision. After inflating, the deploying air bag 14 of the seat bottom 12 immediately deflates. The entire process of inflating, protecting, and deflating takes place in a fraction of a second.

The inflating air bag 14 is adapted to change its position and shape depending on occupant's position in the vehicle seat 10.

The inflated air bag 14 can partially jut out forward or project forward outside of the front part of the seat bottom 12 or of the seat bottom's front edge. This jut or projection of the inflated air bag 14 is necessary for a better contact with the lower parts of the body of an occupant sitting improperly or out of position, or who is tall. The partially jutting out forward inflated air bag 14 increases the length of the seat bottom or of the crash-safety seat 10.

The inflated air bag 14 can partially jut out or project outside of each lateral side of the seat bottom 12. These juts or projections of the inflated air bag 14 is necessary for a better contact with the lower parts of the body of an occupant sitting improperly or out of position, or who is big. The partially jutting out of each lateral side inflated air bag 14 increases the width of the seat bottom or of the crash-safety seat 10.

In comparison with current air bags in existing and new vehicles which may cause serious or fatal injuries during a vehicle collision, the present invention of the vehicle crash-safety seat will allow to protect a great deal of occupants from receiving serious or fatal injuries.

While there has been shown and described a preferred embodiment of the vehicle crash-safety seat of this invention, it is understood that changes in design, materials, and shapes can be made by those skilled in the art without departing from the invention. The invention is defined in the following claims.

I claim:

1. A vehicle crash-safety seat comprising:

a seat bottom having a deploying air bag mounted in said seat bottom and adapted to shoot upward out of said seat bottom when said deploying air bag is inflated during a vehicle collision;

the inflated air bag is located over said seat bottom and includes a lower part which is joined to said seat bottom and a side portion which forms an enlarged occupant contact surface which is under inflation pressure, the inflating air bag being adapted to change position and shape in response to an occupant's position in said seat to force said occupant's body to move into a folded restraining position, thereby transmitting an upward motion of said inflating air bag to a backward motion of said occupant's body, whereby said backward motion of said occupant's body restrains a vehicle occupant from forward inertial movement during said vehicle collision.

2. The vehicle crash-safety seat of claim 1 wherein: said inflated air bag partially juts out forward of the front part of said seat bottom and increases the length of said seat bottom.

3. The vehicle crash-safety seat of claim 1 wherein: said inflated air bag partially juts out of each lateral side of said seat bottom and increases the width of said seat bottom.

4. A vehicle crash-safety seat comprising:

a seat bottom having a deploying air bag mounted in said seat bottom and adapted to shoot upward out of said seat bottom when said deploying air bag is activated during a vehicle collision of a predetermined severity;

the inflated air bag is located over said seat bottom and only the lower part thereof is joined to said seat bottom, the inflating air bag being adapted to take up different positions and to change shape in response to an occupant's position in said seat to form, with a side portion thereof, an enlarged contact surface with said occupant's body, and to force said occupant's body to move into an occupant restraining position, thereby transmitting an upward motion of said inflating air bag to a backward motion of said occupant's body, whereby said backward motion of said occupant's body restrains a vehicle occupant from forward inertial movement during said vehicle collision.

5. The vehicle crash-safety seat of claim 4 wherein: a part of said inflated air bag projects forward outside of the seat bottom's front edge and lengthens said seat bottom.

6. The vehicle crash-safety seat of claim 4 wherein: a part of said inflated air bag projects outside of each lateral edge of said seat bottom and increases the breadth of said seat bottom.

7. A vehicle crash-safety seat comprising:

a seat bottom having a deploying air bag mounted in said seat bottom and adapted to shoot upward out of said seat bottom when said deploying air bag is inflated during a crash of a selected severity;

the inflated air bag is located over said seat bottom and only the lower portion thereof is connected to said seat bottom, the inflating air bag being adapted for changing position and form in response to an occupant's position in said seat for contacting with an occupant's body, and for forcing said occupant's body to move into an occupant restraining position, transmitting an upward motion of said inflating air bag to a backward motion of said occupant's body, whereby said backward motion of said occupant's body restrains a vehicle occupant from movement to the side where the vehicle is impacted during said crash.

8. The vehicle crash-safety seat of claim 7 wherein: said inflated air bag partially juts forward outside of the front edge of said seat bottom and increases the length of said crash-safety seat.

9. The vehicle crash-safety seat of claim 7 wherein: said inflated air bag partially juts outside of each lateral edge of said seat bottom and increases the width of said crash-safety seat.

* * * * *